(12) United States Patent
Berneth et al.

(10) Patent No.: US 6,207,292 B1
(45) Date of Patent: Mar. 27, 2001

(54) ELECTROCHROMIC INDICATING DEVICE

(75) Inventors: Horst Berneth; Uwe Claussen, both of Leverkusen; Dietrich Haarer, Bayreuth; Jochen Schaller, Schwarzenbach, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/147,653

(22) PCT Filed: Jul. 24, 1997

(86) PCT No.: PCT/EP97/03998

§ 371 Date: Mar. 31, 1999

§ 102(e) Date: Mar. 31, 1999

(87) PCT Pub. No.: WO98/05736

PCT Pub. Date: Feb. 12, 1998

(30) Foreign Application Priority Data

Aug. 6, 1996 (DE) .............................................. 196 31 728

(51) Int. Cl.$^7$ ....................................................... C09K 9/02
(52) U.S. Cl. ...................... 428/583; 359/265; 252/301.35
(58) Field of Search .................................... 428/209, 426, 428/583; 359/265; 252/301.35

(56) References Cited

U.S. PATENT DOCUMENTS

| | | | |
|---|---|---|---|
| 3,280,701 | 10/1966 | Donnelly et al. | 88/77 |
| 4,902,108 | 2/1990 | Byker | 350/357 |
| 4,937,150 * | 6/1990 | Tsukada | 428/690 |
| 5,128,267 | 7/1992 | Köcher et al. | 436/92 |

FOREIGN PATENT DOCUMENTS

| | | |
|---|---|---|
| 39 17 323 | 11/1990 | (DE) . |
| 40 07 058 | 9/1991 | (DE) . |
| 44 35 211 | 4/1995 | (DE) . |
| 0 435 689 | 7/1991 | (EP) . |
| 0 476 456 | 3/1992 | (EP) . |
| 0 476 457 | 3/1992 | (EP) . |
| WO 94/23333 | 10/1994 | (WO) . |

OTHER PUBLICATIONS

Tormos, G.V., et al., "Dithiadiazafulvalenes—New Strong Electron Donors. Synthesis, Isolation, Properties, and EPR Studies," J. Am. Chem. Soc., vol. 117, No. 33, pp. 8528–8535, (1995) (No Month).

Bryce, M.R., et al., "Synthesis and Redox Behaviour of Highly Conjugated Bis(benzo–1,3–dithiole) and Bis(benzothiazole) Systems Containing Aromatic Linking Groups: Model Systems for Organic Metals," J. Chem. Soc., Perkin Trans. 2, pp. 1777–1783 (1990), (No Month).

Crispino, G.A., et al., "Synthesis of Tripyridiniumlypropenyl Anions from Tripyridiniumycyclo–propanes and –cyclopropemes," J. Org. Chem., vol. 57, No. 6, pp. 1849–18 55 (1992) (No Month).

Horner, M., et al., "Bicyclo[1.1.0]butanes. A New Synthetic Route and Valence Isomerizations," J. Am. Chem. Soc., vol. 99, No. 18, pp. 6120–6122 (1977) (No Month).

D. Theis in Ullmann's Encyclopedia of Industrial Chemistry, Verlag Chemie, vol. A8, pp. 621–623, (1987) (No Month).

Hünig, S., et al., "Two Step Reversible Redox Systems of the Weitz Type," Topics in Current Chemistry, vol. 92, pp. 1–44 (1980) (No Month).

Deuchert, V.K., et al., "Mehrstufige Organishce Redoxsysteme—Einm Allgemeines Strukturpinzip," Angewandte Chemie, vol. 90, No. 12, pp. 927–1018 (1978) [German] (No Month).

Hünig, S., et al., "DCNQIs—New Electron Acceptors for Charge–Transfer Complexes and Highly Conducting Radical Anion Salts," Advanced Materials, vol. 3, No. 5, pp. 225–236 (1991) (No Month).

* cited by examiner

*Primary Examiner*—Francis J. Lorin
(74) *Attorney, Agent, or Firm*—Foley & Lardner

(57) ABSTRACT

Electrochromic display devices, whose plates having conductive coatings are subdivided into segments which are electrically separated from one another, can be contacted individually and, between the plates, contain a solvent, specific electrochromic substances and optionally conductive salts, are distinguished by excellent edge definition and high contrast.

15 Claims, No Drawings

ELECTROCHROMIC INDICATING DEVICE

The present invention relates to an electrochromic display device.

Electrochromic display devices have been disclosed previously, for example by D. Theis in UIllmann's Encyclopedia of Industrial Chemistry, Vol. A 8, p. 622, Verlag Chemie 1987. Such display devices comprise a pair of glass panes which, on the side facing one another, are coated with a transparent, conductive layer. As a rule, the electrochromic substances are permanently bound to said conductive layer or are deposited thereon during operation. Among electrochromic substances, the couple tungsten oxide/palladium hydride is the best-known. Viologens have also been proposed. These display devices are not self-erasing, i.e. the generated image persists after the current has been switched off and can only be erased again by voltage reversal. Such devices are not particularly stable and do not allow a large number of switching cycles. Moreover, cells built from tungsten oxide/palladium hydride in particular cannot, because of light scattering on these electrochromic layers, be operated in transmitted light, but only reflectively.

WO-94/23333 compares variously constructed electrochromic cells, which are not used as display devices, however:

a) cells in which the electrochromic substances, in the form of a film or layer, permanently lie on the electrodes (cf. Ullmann, see above), b) cells in which the electrochromic substances are deposited on the electrodes as a layer during the redox process (cf. Ullmann, see above), c) cells in which the electrochromic substances remain permanently in solution.

With the latter type, two serious drawbacks are emphasized, inter alia:

1) the diffusion of electrochromic substances in the solution, 2) the high current consumption to maintain the color, since said color, owing to diffusion, is decaying all the time by recombination and reaction at the opposite electrode.

U.S. Pat. No. 4,902,108 discloses an electrochromic system of said last-mentioned type c). An electrochromic cell likewise comprising glass plates having conductive coatings contains a solution of a couple of electrochromic substances in an inert solvent.

Used as a redox couple is one reducible and one oxidizable substance. Both are colorless or only weakly colored. Under the influence of an electric voltage, one of the substances is reduced and the other is oxidized, at least one becoming colored in the process. After the voltage is switched off, the two original redox substances are formed once more, accompanied by bleaching or fading of the color.

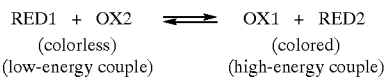

RED1 + OX2 ⇌ OX1 + RED2
(colorless)       (colored)
(low-energy couple)  (high-energy couple)

U.S. Pat. No. 4,902,108 discloses that those redox couples are suitable in which the reducible substance exhibits at least two chemically reversible reduction waves in the cyclic voltammogram and the oxidizable substance correspondingly exhibits at least two chemically reversible oxidation waves.

Various applications have been described for such electrochromic cells. For example, they may take the form of a car rear view mirror which during a journey at night can be darkened by a voltage being applied and thus prevents dazzling by the headlights of vehicles following behind (compare e.g. U.S. Pat. No. 3,280,701, U.S. Pat. No. 4,902, 108, EP-A-0,435,689). Such cells may further also be employed in window panes or car canopies where, after a voltage has been applied, they black out the sunlight.

Such electrochromic cells normally comprise a pair of glass panes, one of which is mirrored in the case of the car mirror. One side of these panes is coated areally with a transparent, electroconductive layer, e.g. indium tin oxide (ITO). These panes are then used to construct a cell by being joined together, via a sealing ring, with their electroconductively coated sides facing one another, to form a cell. This cell is then, via a port, filled with an electrochromic fluid and is tightly sealed. Via the ITO layers the two panes are connected to a voltage source.

Electrochromic cells of the type just outlined have been described exclusively for constructing components which can be colored over their entire area, such as the car mirrors, window panes or car canopies just mentioned. Such components which could be colored over their entire area were also used as a basis for deriving electrochromic displays of a very simple design, in which a two-dimensional electrochromic cell was either covered with an opaque plate from which the symbols to be represented had been cut out or in which the symbols made of opaque material were applied to the two-dimensional electrochromic cell. In both cases the symbols became visible when the cell was de-energized and thus bright, and invisible when the cell was live and therefore dark. Edge definition problems owing to diffusion are thus reliably prevented or do not play a significant role. The edge definition is provided by the masks.

From what was known, in particular on the basis of the drawbacks mentioned in WO-94/23333 it was reasonable to apprehend that electrochromic display devices in which information can be represented variably, e.g. via individually driven segments, bars or points, on the basis of the design just described of U.S. Pat. No. 4,902,108 would not be possible. In particular it seemed likely that the edge definition of the segments to be displayed would be unsatisfactorily poor, since the electrochromic substances are freely mobile in the electrochromic fluid and therefore, in particular in the event of prolonged operation, because of diffusion would color even those areas of the display device which are not actually energized.

The invention then relates to an electrochromic display device comprising at least two transparent substrates, preferably panes of glass or plastic, which are joined to one another via a spacer ring and of which at least one has an electrically conductive, transparent coating on the side facing the other and one of the substrates may be mirrored, wherein at least one of the substrates having a conductive coating is subdivided into segments which are electrically separated from one another and can be contacted singly, and there is contained, between the substrates, a) a solvent, b) dissolved in this solvent at least one oxidizable substance $RED_1$ which, by releasing electrons at an anode, is converted into its respective form $OX_1$ with a change in absorbance in the visible region of the spectrum, and at least one reducible substance $OX_2$ which by accepting electrons at a cathode, is converted into its respective form $RED_2$ with a change in absorbance in the visible region of the spectrum, the original forms $RED_1$ and $OX_2$ each being recovered after charge equalization, c) optionally a conductive salt.

The change in absorbance in the visible region of the spectrum may refer to a) $OX_2$ and/or $RED_1$ being colorless or only weakly colored, whereas the forms $RED_2$ and/or $OX_1$ formed at the cathode and anode, respectively, are colored, preferably strongly colored, b) at least one of the two electrochromic substances $OX_2$ or $RED_1$ being colored, while their forms $RED_2$ or $OX_1$ respectively, formed at the cathode or anode, respectively, are not colored or only weakly colored or have a different color.

These special embodiments under a) and b) likewise form part of the subject matter of the invention.

Involved in particular are single-cell display devices in which the cathode compartment and anode compartment are not separated from one another by, for example, ion-permeable membranes or the like.

The subdivision of the plates having conductive coatings into segments electrically separated from one another can be effected in various ways:

a) by direct driving, where:

aa) only one of the two plates is subdivided into segments, whereas the other plate is not patterned, i.e. its entire area have a conductive coating, ab) both plates are subdivided into segments, or ac) only one of the two plates has a conductive coating and is subdivided into segments, whereas the other one does not have a conductive coating, or b) multiplexed driving, in which the segments are combined into groups of which each has a different backing electrode.

In the embodiment according to aa) one terminal of the voltage source is connected to the unpatterned plate, while the other one, depending on the image to be depicted, is connected to one or more of the segments.

In the case of the design according to ab) the subdivision of the two plates into segments can take place homologously, i.e. segments of identical shapes are situated on the two plates in pairwise congruence above one another. Contacting and current flow then take place via such pairs of segments, Alternatively, the subdivision can be effected in such a way that one group of adjoining segments on one of the two plates faces a uniform area on the other plate, whose shape corresponds, for example, to the overall shape of the group of segments. Driving is then effected, for example, by one of the terminals of the voltage source being connected to one or more of these large segments of the second plate, while the second terminal drives individual segments from the groups of segments of the first plate.

In the case of the embodiment according to ac) driving is effected, for example, by the two terminals of the voltage source being connected to respective adjacent segments. Since adjoining segments will then be of opposite electric polarity, colors will develop differently, for example, on the two segments in accordance with the different cathode and anode reactions.

The segments may be fashioned at will. It is possible to use them, for example, to produce whatever shapes representing pictures, logos, letters or numerals. Such shapes may be combined, next to one another, to produce an overall pattern, a picture, lettering, a number, the individual sections having been made contact with independently of one another. In particular, however, those subdivisions of the segments are referred to which are suitable for a matrix-type representation with multiplexed driving. Thus bars, squares or points can be arranged in such a way that it is possible, by specific such segments (elements) being driven in a controlled manner, to depict letters, numerals, words, figures, but also pictures. The display can preferably be effected in positive contrast, dark or colored on a bright background or vice versa or alternatively in negative contrast in two different colors, for example blue on a yellow background or vice versa. Alternatively, however, an embodiment is possible in which, for example, the information items in the de-energized state are blue on a colorless background and in the energized state are red on a green background. By adjusting the slope of the characteristic curve it is possible to depict gray levels within a certain range.

Coloring, contrast and edge definition are defined by the types of construction sketched above under a) and b), by the polarity of the electric current and by the dynamics of the redox couples $RED_1$ and $OX_2$ employed, for example their drift in the electric field, their diffusion and their recombination with electron transfer. The charge transfer, molecular size and shape and the kinetics of the electron transfer, for example, will thus affect the dynamics. These dynamic processes prevent deposition of the electrochromic substances at the electrodes and the concomitant restricted reversibility and low number of cycles typical for all known electrochromic display devices.

By selecting the electrochromic compounds $RED_1$ and $OX_2$ and/or mixtures thereof it is possible to match any monochrome hue required. To achieve a polychrome color representation it is possible for two or more of such electrochromic display devices to be placed on top of one another like sheets, each of these devices being able to generate a different hue. Such a stack is preferably built up in such a way that the display devices in contact with one another have a transparent plate in common which then, in the case of the abovementioned designs aa) and ab) then also has conductive coatings on both sides and, depending on the embodiment, is subdivided into segments. A stack then, for example, consists of three electrochromic display devices comprising at least three plates. Incorporating segments in various of these stacked devices makes it possible to implement polychrome displays. Energizing segments situated behind one another, of various such devices, results in mixed colors. Thus it is possible, within the context of trichromatism, to depict any color desired, i.e. multicolored pictures, for example.

Reducible substances $OX_2$ suitable for the purpose of the invention are those which a) in the solvent employed in the device exhibit a cyclic voltammogram which has at least one, preferably at least two chemically reversible reduction stages, b) represent a cyclic organic compound which, after accepting 1 or 2 electrons, is converted, one of the a bonds of the ring being broken, into an open-ring compound and which, by releasing 1 or 2 electrons, is converted once more into the cyclic starting compound.

Such compounds mentioned under b) as a rule show, in the cyclic voltammogram, a chemically irreversible reduction stage followed by a chemically irreversible oxidation stage. As a rule, a total of two electrons is transferred when a ring is opened or closed. The compounds under b) are not, however, to be restricted to those exhibiting the behavior just described in the cyclic voltammogram or in which two electrons are transferred when a ring is opened or closed.

Oxidizable substances RED, suitable for the purpose of the invention are those which in the solvent employed in the display device exhibit a cyclic voltammogram which has at least one, preferably two chemically reversible oxidation stages.

OX₂ suitable for the purpose of the invention include:

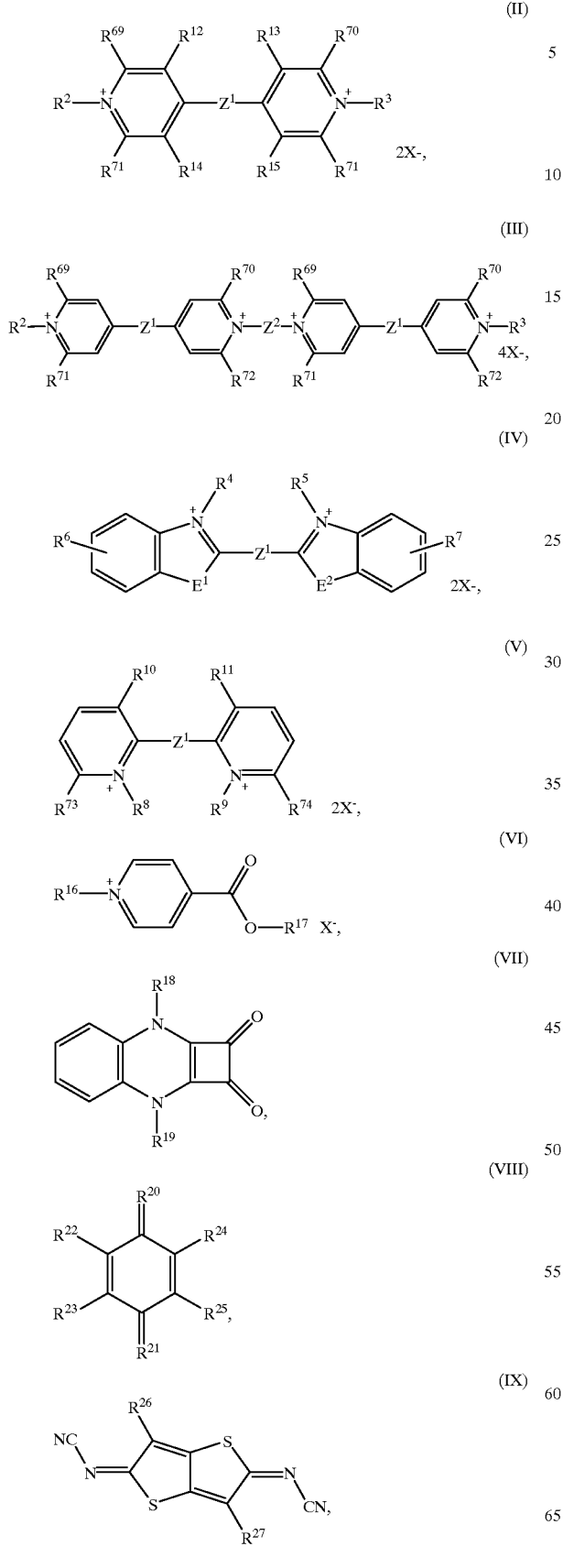
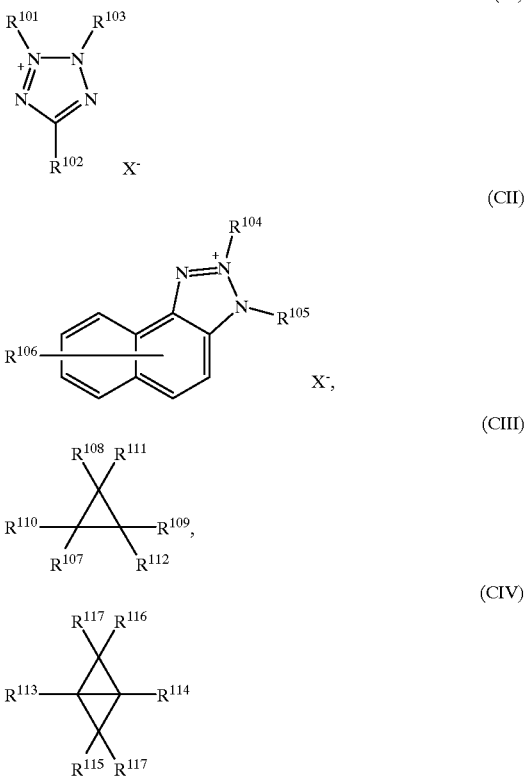

in which

R² to R⁵, R⁸, R⁹, R¹⁶ to R¹⁹, independently of one another, represent $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl or R⁴; R⁵ or R⁸; R⁹ may jointly form a —(CH₂)₂— or —(CH₂)₃— bridge, R⁶, R⁷ and R²² to R²⁵, independently of one another, represent hydrogen, $C_1$- to $C_4$-alkyl, $C_1$- to $C_4$-alkoxy, halogeno, cyano, nitro or $C_1$- to $C_4$-alkoxycarbonyl or R²²; R²³ and/or R²⁴ may form a —CH=CH—CH=CH— bridge, R¹⁻; R¹¹, R¹²; R¹³ and R¹⁴; R¹⁵, independently of one another, represent hydrogen or pairwise represent a —(CH₂)₂—, —(CH₂)₃— or —CH=CH— bridge, R²⁰ and R²¹, independently of one another, represent O, N—CN, C(CN)₂ or N—$C_6$— to —$C_{10}$-aryl, R²⁶ and R²⁷ represent hydrogen, $C_1$- to $C_4$-alkyl, $C_1$- to $C_4$-alkoxy, halogeno, cyano, nitro, $C_1$- to $C_4$-alkoxycarbonyl or $C_6$- to $C_{10}$-aryl, R⁶⁹ to R⁷⁴, independently of one another, represent hydrogen or $C_1$- to $C_6$-alkyl or R⁶⁹; R¹² and/or R⁷⁰; R¹³ jointly form a —CH=CH—CH=CH— bridge, E¹ and E², independently of one another, represent O, S, NR¹ or C(CH₃)₂ or E¹ and E² jointly form an —N—(CH₂)₂—N— bridge, R¹ represents $C_1$- to $C_{18}$-alkyl, $C_2$- to $C_{12}$-alkenyl, $C_4$- to $C_7$-cycloalkyl, $C_7$- to $C_{15}$-aralkyl, $C_6$- to $C_{10}$-aryl, Z¹ represents a direct bond, —CH=CH—, —C(CH₃)=CH—, —C(CN)=CH—, —CCl=CCl—, —C(OH)

=CH—, —CCl=CH—, —C═C—, —CH=N—N=CH—, —C(CH₃)=N—N=C(CH₃)— or —CCl=N—N=CCl—, $Z^2$ represents —(CH$_2$)$_r$— or —CH$_2$—C$_6$H$_4$—CH$_2$—, r represents an integer from 1 to 10, $R^{101}$ to $R^{105}$, independently of one another, represent C$_6$- to C$_{10}$-aryl or an aromatic or quasi-aromatic five- or six-membered heterocyclic ring each of which is optionally benzanellated, $R^{107}$, $R^{109}$, $R^{113}$ and $R^{114}$, independently of one another, represent a radical of the formulae (CV) to (CVII)

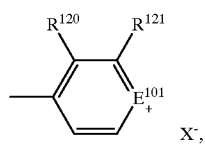

(CV)

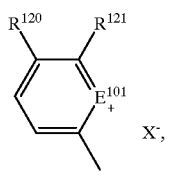

(CVI)

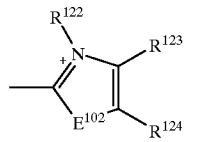

(CVII)

$R^{108}$, $R^{115}$ and $R^{116}$, independently of one another, represent C$_6$- to C$_{10}$-aryl or a radical of the formula (CV), $R^{110}$ to $R^{112}$, $R^{117}$ and $R^{118}$, independently of one another, represent hydrogen, C$_1$- to C$_4$-alkyl, halo(leno or cyano, $E^{101}$ and $E^{102}$, independently of one another, represent O, S or N—$R^{119}$, $R^{119}$ and $R^{122}$, independently of one another, represent hydrogen, C$_1$- to C$_{18}$-alkyl, C$_2$- to C$_8$-alkenyl, C$_4$- to C$_7$-cycloalkyl, C$_7$- to C$_{15}$-aralkyl or C$_6$- to C$_{10}$-aryl, $R^{106}$, $R^{120}$, $R^{121}$, $R^{123}$ and $R^{124}$, independently of one another, represent hydrogen, C$_1$- to C$_4$-alkyl, C$_1$- to C$_4$-alkoxy, halogeno, cyano, nitro or C$_1$- to C$_4$-alkoxycarbonyl or $R^{120}$, $R^{121}$ or $R^{123}$, $R^{124}$ jointly form a —CH=CH—CH=CH— bridge and X⁻ represents an anion which is redox-inert under the conditions.

OX$_2$ suitable for the purpose of the invention also include metal salts or metal complexes, preferably of metal ions whose oxidation states differ by 1. Examples of suitable metal ions OX$_2$/RED$_2$ include Fe$^{3+}$/Fe$^{2+}$, Ni$^{3+}$/Ni$^{2+}$, Co$^{3+}$/Co$^{2+}$, Cu$^{2+}$/Cu$^+$.

RED$_1$ suitable for the purposes of the invention include:

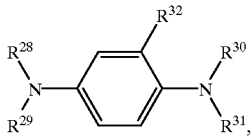

(X)

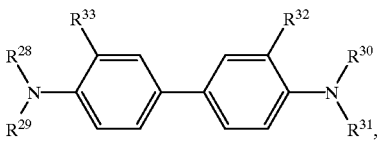

(XI)

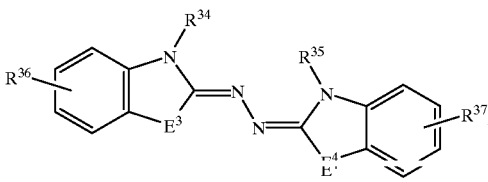

(XII)

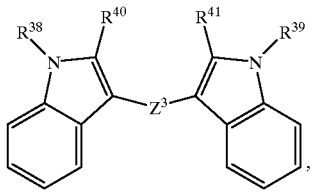

(XIII)

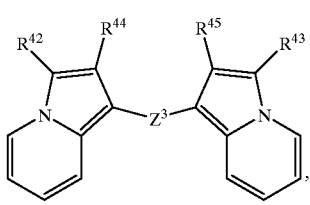

(XIV)

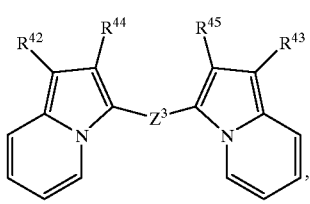

(XV)

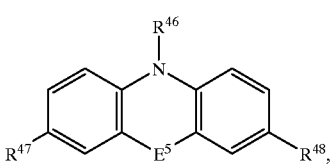

(XVI)

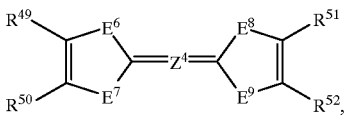

(XVII)

-continued

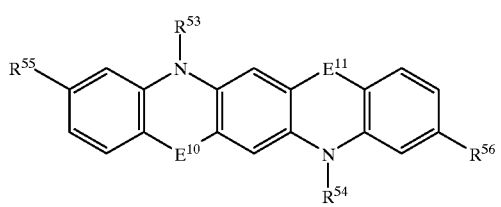
(XVIII)

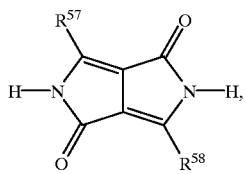
(XIX)

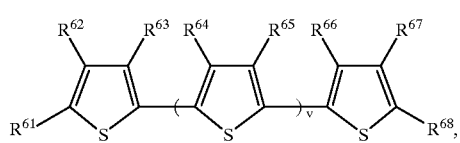
(XX)

in which
R$^{28}$ to R$^{31}$, R$^{34}$, R$^{35}$, R$^{38}$, R$^{39}$, R$^{46}$, R$^{53}$ and R$^{54}$, independently of one another, represent C$_1$- to C$_{18}$-alkyl, C$_2$- to C$_{12}$-alkenyl, C$_4$- to C$_7$-cycloalkyl, C$_7$- to C$_{15}$-aralkyl or C$_6$- to C$_{10}$-aryl, R$^{32}$, R$^{33}$, R$^{36}$, R$^{37}$, R$^{40}$, R$^{41}$, R$^{42}$ to R$^{45}$, R$^{47}$, R$^{48}$, R$^{49}$ to R$^{52}$ R$^{55}$ to R$^{58}$, independently of one another, represent hydrogen, C$_1$- to C$_4$-alkyl, C$_1$- to C$_4$-alkoxy, halogeno, cyano, nitro, C$_1$- to C$_4$-alkoxycarbonyl, C$_6$- to C$_{10}$-aryl and R$^{57}$ and R$^{58}$ additionally represent an aromatic or quasiaromatic five- or six-membered heterocyclic ring which is optionally benzannelated and R$^{48}$ additionally represents NR$^{75}$R$^{76}$ or R$^{49}$, R$^{50}$ and/or R$^{51}$; R$^{52}$ form a —(CH$_2$)$_3$—, —(CH$_2$)$_4$—, —(CH$_2$)$_5$— or —CH=CH—CH=CH— bridge, Z$^3$ represents a direct bond, a —CH=CH— or —N=N— bridge, =Z$^4$= represents a direct double bond, a =CH—CH= or =N—N= bridge, E$^3$ to E$^5$, E$^{10}$ and E$^{11}$, independently of one another, represent O, S, NR$^{59}$ or C(CH$_3$)$_2$ and E$^5$ additionally represents C=O or SO$_2$, E$^3$ and E$^4$, independently of one another, additionally may represent —CH=CH—, E$^6$ to E$^9$, independently of one another, represent S, Se or N$^{59}$, R$^{59}$, R$^{75}$ and R$^{76}$ independently of each other represent C$_1$- to C$_{12}$-alkyl, C$_2$- to C$_8$-alkenyl, C$_4$- to C$_7$-cycloalkyl, C$_7$- to C$_{15}$-aralkyl, C$_6$- to C$_{10}$-aryl and R$^{75}$ additionally represents hydrogen or R$^{75}$ and R$^{76}$ in the meaning of NR$^{75}$ R$^{76}$ represent together with the N-atom to which they are bound a five- or six-membered saturated heterocyclic ring which optionally contains further hetero atoms, R$^{61}$ to R$^{68}$, independently of one another, represent hydrogen, C$_1$- to C$_6$-alkyl, C$_1$- to C$_4$-alkoxy, cyano, C$_1$- to C$_4$-alkoxycarbonyl or C$_6$- to C$_{10}$-aryl and R$^{61}$; R$^{62}$ and R$^{67}$; R$^{68}$, independently of one another, additionally form a —(CH$_2$)$_3$—, —(CH$_2$)$_4$— or —CH=CH—CH=CH— bridge, and v represents an integer from 0 to 10.

RED$_1$ suitable for the purposes of the invention also include metal salts or metal complexes, preferably of metal ions whose oxidation states differ by 1. Examples of suitable metal ions RED$_1$/OX$_1$ include Fe$^{2+}$/Fe$^{3+}$, Ni$^{2+}$Ni$^{3+}$, Co$^{2+}$/Co$^{3+}$, Cu$^+$/Cu$^{2+}$.

Likewise suitable for the purpose of the invention are those redox couples which are linked to one another via a covalent bridge according to the formula

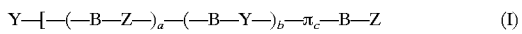

in which

Y and Z, independently of one another, represent a radical OX$_2$ or RED$_1$, at least one Y representing OX$_2$, and at least one Z representing RED$_1$, however, where OX$_2$ represents the radical of an electrochemically reversibly reducible redox system, and RED$_1$ represents the radical of an electrochemically reversibly oxidizable redox system, B represents a bridge member, c represents an integer from 0 to 5, and a and b, independently of one another, represent an integer from 0 to 5.

In this context, electrochemically reversibly reducible or oxidizable means that electron transfer can take place without a change or alternatively with a change in the σ skeleton, entirely in line with the abovementioned definition of the OX$_2$ and RED$_1$ according to the invention.

In particular, the electrochromic compounds of the formula (I) refer to those of the formulae

(Ia)

(Ib)

(Ic)

(Id)

in which

OX$_2$, RED$_1$ and B have the abovementioned meanings and d represents an integer from 1 to 5.

OX$_2$ and RED$_1$ in the formulae (I) and (Ia) to (Id) in particular refer to radicals of the above-described redox systems of the formulae (II) to (IX), (CI) to (CIV) and (X) to (XX), where the bond to the bridge member B is effected via one of the radicals R$^2$ to R$^{19}$, R$^{22}$ to R$^{27}$, R$^{28}$ to R$^{58}$, R$^{61}$, R$^{62}$, R$^{67}$, R$^{68}$, R$^{122}$ or, in the case that one of the radicals E$^1$ or E$^2$ represents NR$^1$, or one of the radicals E$^3$ to E$^{11}$ represents NR$^{59}$, or one of the radicals E$^{101}$ to E$^{102}$ represents R$^{119}$ is effected via R$^1$, R$^{59}$ or R$^{119}$ and said radicals then represent a direct bond, and B represents a bridge of the formulae —(CH$_2$)$_n$— or —[Y$^1$$_s$(CH$_2$)$_m$—Y$^2$]$_o$—(CH$_2$)$_p$—Y$^3$$_q$—, which may be substituted by C$_1$- to C$_4$-alkyl, C$_1$- to C$_4$-alkoxy, halogeno or phenyl, Y$^1$ to Y$^3$, independently of one another, represent O, S, NR$^{60}$, COO, CONH, NHCONH, cyclopentanediyl, cyclohexanediyl, phenylene or naphthylene, $R^{60}$ represents $C_1$- to $C_6$-alkyl, $C_2$- to $C_6$-alkenyl, $C_4$- to $C_7$-cycloalkyl, $C_7$— to $C_{15}$-aralkyl or $C_6$- to $C_{10}$-aryl, n represents an integer from 1 to 12, m and p, independently of one another, represent an integer from 0 to 8, o represents an integer from 0 to 6 and q and s, independently of one another, represent 0 or 1.

It was found, surprisingly, that using one of the electrochromic display devices just described it is possible to display information with excellent edge definition and high image contrast. Especially good edge definition is obtained, in particular, if the electrochromic substances of the formula (I) are employed.

Examples of metal salts or metal complexes which can be used as $OX_2$ or RED, are $Fe^{3+/2+}$, $Ni^{3+/2+}$, $Co^{3+/2+}$, $Cu^{2+/+}$, $[Fe(CN)_6]^{3-/4-}$, $Fe_4[Fe(CN)_6]_3^{0/4-}$, $[Co(CN)_6]^{3-/4-}$, (Fe(cyclopentadienyl)$_2$)$^{0/+}$.

Possible counterions for metal ions and cationic complexes include all redox-inert anions $X^-$ as will be described in more detail below, and possible counterions of the anionic complexes include all redox-inert cations $M^+$, for example alkali metals or quaternized ammonium salts such as $Na^+$, $K^+$, $N(CH_3)_4^+$, $N(C_4H_9)_4^+$, $C_6H_5CH_2N(CH_3)_3^+$ and others.

Preference is given to an electrochromic display device in which $OX_2$ represents a radical of the formulae (II), (III), (IV), (V) or (CI), in which $R^2$, $R^3$, $R^4$, $R^5$, $R^8$ and $R^9$, independently of one another, represent $C_1$- to $C_{12}$-alkyl, $C_2$- to $C_8$-alkenyl, $C_5$- to $C_7$-cycloalkyl, $C_7$- to $C_{15}$-aralkyl or $C_6$- to $C_{10}$-aryl, $R^6$ and $R^7$, independently of one another, represent hydrogen, methyl, ethyl, methoxy, ethoxy, fluoro, chloro, bromo, cyano, nitro, methoxycarbonyl or ethoxycarbonyl, $R^{10}$, $R^{11}$; $R^{12}$, $R^{13}$ and $R^{14}$, $R^{15}$, independently of one another, represent hydrogen or, if $Z^1$ represents a direct bond, pairwise represent a —$(CH_2)_2$—, —$(CH_2)_3$— or —CH=CH— bridge, or $R^4$; $R^5$ and $R^8$; $R^9$, independently of one another, pairwise represent a —$(CH_2)_2$—, or —$(CH_2)_3$— bridge, if $Z^1$ represents a direct bond, and then $R^{69}$ to $R^{74}$, independently of one another, represent hydrogen or $C_1$ to $C_4$-alkyl, $E^1$ and $E^2$ are identical and represent O, S, $NR^1$ or $C(CH_3)_2$ or jointly form an —N—$(CH_2)_2$—N-bridge, $R^1$ represents $C_1$- to $C_{12}$-alkyl, $C_2$- to $C_4$-alkenyl, $C_1$- to $C_7$-cycloalkyl, $C_7$- to $C_{15}$-aralkyl or $C_6$- to $C_{10}$-aryl, $Z^1$ represents a direct bond, —CH=CH—, —C(CH$_3$)=CH—, —C(CN)=CH—, —C≡C— or —CH=N—N=CH—, $Z^2$ represents —$(CH_2)_r$— or —$CH_2$—$C_6H_4$—p—$CH_2$—, r represents an integer from 1 to 6, $R^{101}$ to $R^{103}$, independently of one another, represent a radical of the formulae

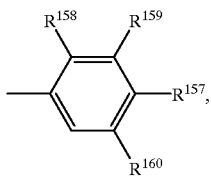

(CXIX)

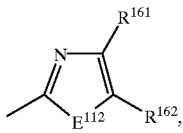

(CXX)

in which $R^{157}$ to $R^{162}$, independently of one another, represent hydrogen, $C_1$- to $C_6$-alkyl, $C_1$- to $C_6$-alkoxy, halogeno, cyano, nitro, bis($C_1$- to $C_4$-alkyl)amino, tris-($C_1$- to $C_4$-alkyl)ammonio, $C_1$- to $C_4$-alkoxycarbonyl or COOH or radicals located pairwise next to one another jointly form an —O—$(CH_2)_{2-3}$—, —O—$(CH_2)_{1-2}$—O—, $NR^{163}$—$(CH_2)_{2-3}$— or $NR^{163}$—$(CH_2)_{1-2}$—O— bridge or $R^{158}$; $R^{159}$ and/or $R^{161}$; $R^{162}$ form a —CH=CH—CH=CH— bridge which may be substituted by methyl, methoxy or chloro, $R^{163}$ represents hydrogen or $C_1$- to $C_4$-alkyl, $E^{112}$ represents O, S or $NR^{164}$, $R^{164}$ represents hydrogen, $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl and $X^-$ represents an anion which is redox-inert under the conditions, $RED_1$ represents one of the radicals of an anodic redox system of the formula (X), (XI), (XII), (XIII), (XVI), (XVII), (XVIII) or (XX), $R^{28}$ to $R^{31}$, $R^{34}$, $R^{35}$, $R^{38}$, $R^{39}$, $R^{46}$, $R^{53}$ and $R^{54}$, independently of one another, represent $C_1$- to $C_{12}$-alkyl, $C_2$- to $C_8$-alkenyl, $C_1$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{47}$, $R^{48}$, $R^{49}$ to $R^{52}$, $R^{55}$ and $R^{56}$, independently of one another, represent hydrogen, methyl, ethyl, methoxy, ethoxy, fluoro, chloro, bromo, cyano, nitro, methoxycarbonyl, ethoxycarbonyl or phenyl, $R^{48}$ additionally represents $NR^{75}R^{76}$, $Z^3$ represents a direct bond, a —CH=CH— or —N=N— bridge, =$Z^4$= represents a direct double bond, a =CH—CH= or =N—N= bridge, $E^3$ to $E^5$, $E^{10}$ and $E^{11}$, independently of one another, represent O, S, $N^{59}$ or $C(CH_3)_2$, but $E^3$ and $E^4$ have identical meanings, and $E^5$ additionally represents C=O $E^6$ to $E^9$ are identical to one another and represent S, Se or $NR^{59}$, $R^{59}$, $R^{75}$ and $R^{76}$ independently of one another represent $C_1$- to $C_{12}$-alkyl, $C_2$- to $C_8$-alkenyl, $C_5$- to $C_7$-cycloalkyl, $C_7$- to $C_{15}$-aralkyl, $C_6$- to $C_{10}$-aryl, and $R^{75}$ additionally represents hydrogen or $R^{75}$ and $R^{76}$ in the meaning of $NR^{75}R^{76}$ represent together with the N-atom to which they are bound pyrrolidino, piperidino or morpholino, $R^{61}$, $R^{62}$, $R^{67}$ and $R^{68}$, independently of one another, represent hydrogen, $C_1$- to $C_4$-alkyl, methoxycarbonyl, ethoxycarbonyl or phenyl or pairwise form a —$(CH_2)_3$— or —$(CH_2)_4$— bridge, $R^{63}$ to $R^{66}$ represent hydrogen v represents an integer from 1 to 6.

Preference is likewise given to an electrochromic display device which contains one of the compounds of the formulae (Ia) to (Id), in which $OX_2$ represents one of the radicals of the formulae (II), (III), (IV) or (V), the bond to the bridge member B being effected via one of the radicals $R^2$ to $R^{11}$ or, in the case where $E^1$ or $E^2$ represents $NR^1$, being effected via $R^1$ and said radicals then representing a direct bond and all the other radicals having the abovementioned preferred meaning, $RED_1$ represents one of the radicals of the formulae (X), (XI), (XII), (XIII), (XVI), (XVII), (XVIII) or (XX), the bond to the bridge member B being effected via one of the radicals $R^{28}$ to $R^{41}$, $R^{46}$ to $R^{56}$, $R^{61}$, $R^{62}$, $R^{67}$, $R^{68}$, or, in the case that one of the radicals $E^3$ to $E^1$ represents $NR^{59}$, and said radicals then representing a direct bond and all the other radicals having the abovementioned preferred meaning, and B represents a bridge of the formulae —$(CH_2)_n$—, —$(CH_2)_m$—O—$(CH_2)_p$—, —$(CH_2)_m$—$NR^1$—$(CH_2)_p$—, —$(CH_2)_m$—$C_6H_4$—$(CH_2)_p$—, —[O—$(CH_2)_p$]$_o$—O—, —[$NR^{60}$—$(CH_2)_p$]$_o$—$NR^{60}$—, —[$C_6H_4$—$(CH_2)_p$]$_o$—$C_6H_4$—, —$(CH_2)_m$—OCO—$C_6H_4$—COO—$(CH_2)_p$—, —$(CH_2)_m$—NHCO—$C_6H_4$—CONH—$(CH_2)_p$—, —$(CH_2)_m$—NHCONH—$C_6H_4$—NHCONH—$(CH_2)_p$—, —$(CH_2)_m$—OCO—$(CH_2)_t$—COO—$(CH_2)_p$—, —$(CH_2)_m$—NHCO—$(CH_2)_t$—CONH—$(CH_2)_p$—, —$(CH_2)_m$—NHCONH—$(CH_2)_t$—NHCONH—$(CH_2)_p$—, $R^{60}$ represents methyl, ethyl, benzyl or phenyl, n represents an integer from 1 to 10, m and p, independently of one another, represent an integer from 0 to 4, o represents an integer from 0 to 2 and t represents an integer from 1 to 6.

Likewise preferred is an electrochromic display device which contains mixtures of the electrochromic substances mentioned above in general and as being preferred. Examples of such mixtures are (II)+(CI)+(XVI), (II)+(IV)+(XII), (Ia)+(II)+(XVI), (Ia)+(CI), without any restriction being intended to be expressed thereby.

The mixing ratios are variable within wide limits. They allow optimization of the desired hue and/or optimization of the desired dynamics (see below) of the display device.

In the abovementioned substituent meanings alkyl radicals including modified ones, such as alkoxy or aralkyl radicals, are preferably those having from 1 to 12 C atoms, in particular having from 1 to 8 C atoms, unless stated otherwise. They may be straight-chain or branched and optionally carry further substituents such as $C_1$- to $C_4$-alkoxy, fluoro, chloro, hydroxy, cyano, $C_1$- to $C_4$-alkoxycarbonyl or COOH.

Cycloalkyl radicals are preferentially understood to be those having from 3 to 7 C atoms, in particular having 5 or 6 C atoms.

Alkenyl radicals are preferably those having from 2 to 8 C atoms, in particular from 2 to 4 C atoms.

Aryl radicals, including those in aralkyl radicals, are phenyl or naphthyl radicals, in particular phenyl radicals.

They may be substituted with from 1 to 3 of the following radicals: $C_1$- to $C_6$-alkyl, $C_1$- to $C_6$-alkoxy, fluoro, chloro, bromo, cyano, hydroxy, $C_1$- to $C_6$-alkoxycarbonyl or nitro. Two adjacent radicals may alternatively form a ring.

Aromatic or quasi-aromatic five- or six-membered heterocyclic, optionally benzanellated rings are meant to include, in particular, imidazole, benzimidazole, oxazole, benzoxazole, thiazole, benzothiazole, indole, pyrazole, triazole, thiophene, isothiazole, benzisothiazole, 1,3,4- or 1,2,4-thiadiazole, pyridine, quinoline, pyrimidine and pyrazine. They may be substituted with from 1 to 3 of the following radicals: $C_1$- to $C_6$-alkyl, $C_1$- to $C_6$-alkoxy, fluoro, chloro, bromo, cyano, nitro, hydroxy, mono- or di-$C_1$- to $C_6$-alkylamino, $C_1$- to $C_6$-alkoxycarbonyl, $C_1$- to $C_6$-alkylsulphonyl, $C_1$- to $C_6$-alkanoylamino, phenyl or naphthyl. Two adjacent radicals may alternatively form a ring.

The electrochromic substances are either known (Topics in Current Chemistry, Vol. 92, pp. 1–44, (1980), Angew. Chem. 90 927 (1978), Adv. Mater. 3, 225, (1991), German Offenlegungsschrift 3,917,323, J. Am. Chem. Soc. 117, 8528 (1995), J.C.S. Perkin II 1990, 1777, German Offenlegungsschrift 4,435,211, EP-A 476,456, EP-A 476,457, German Offenlegungsschrift 4,007,058, J. Org. Chem. 57, 1849 (1992) and J. Am. Chem. Soc. 99, 6120, 6122 (1977)) or can be prepared in a similar manner. The compounds of the formula (I) can be synthesized from building blocks known per se, for example in accordance with the following scheme:

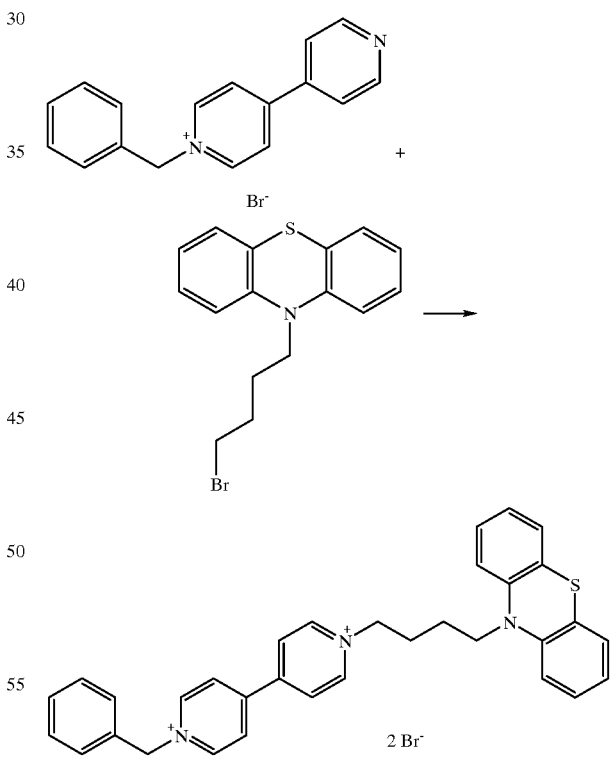

Ions such as bromide, required for the synthesis, are then exchanged for redox-inert ions.

The novel electrochromic display device comprises two transparent plates, for example made of glass or plastic such as polycarbonate, which are provided with an electroconductive, transparent layer. This conductive layer comprises, for example, indium tin oxide (ITO), antimony- or fluorine-doped tin oxide, antimony- or aluminum-doped zinc oxide, tin oxide or conductive organic polymers such as, for example, optionally substituted polythienyls, polypyrroles, polyanilines, polyacetylene. Thus a transmissive electrochromic display device is obtained which can be viewed in transmitted light. One of the two plates may also be mirrored, thus affording a reflective electrochromic display device. Mirroring can be effected by employing silver, chromium, palladium, rhodium, aluminum or other known materials. This mirroring layer may itself serve as a conductive layer. At least one of the two conductive layers or both are subdivided into segments which are electrically separated from one another and with which contact is made individually. Alternatively, only one of the two plates may have a conductive coating and be subdivided into segments. The separation of the segments may be effected, for example, by mechanical removal of the conductive layer, for example by scribing, scratching, scraping or milling, or chemically, for example by etching using, for example, a hydrochloric solution of $FeCl_2$ and $SnCl_2$. Said removal of the conductive layers may be controlled locally via masks, e.g. photoresist masks. It is also possible, however, for the electrically separated segments being produced by the conductive layer being applied, e.g. by sputtering or printing, in a controlled manner, e.g. by means of masks. Contact is made with the segments by means of, for example, fine strips of conductive material, the segment as a result being electroconductively connected to a contact at the edge of the electrochromic device. These fine contact strips may either be made of the same material as the conductive layer itself and, for example, be produced at the same time as said layer is being subdivided into segments as described above, or alternatively, e.g. to improve the conductivity, be made of a different material such as fine metallic conductors, for example of copper or silver. A combination of metallic material and the material of the conductive coating is also possible. These metallic conductors may either be applied in the form of fine wires, e.g. by being glued on, or alternatively be printed. All these techniques just described are generally known from the fabrication of liquid crystal displays (LCDs).

The displays can be viewed in transmitted light or alternatively reflectively via a mirror coating.

The two plates are laid on top of one another, with the sides facing one another which have conductive coatings and are subdivided into segments, the two plates being separated by, for example, a sealing ring, and are bonded to one another at their edges. The sealing ring may be made, for example, of plastic or thin glass or another material which is nonconductive and inert with respect to the electrochromic fluid. For example, the sealing ring may also be established via a thermosetting or photochemically curable adhesive, the adhesive optionally being admixed with spacer elements. Examples of such adhesives are epoxy resins and acrylates. Alternatively, however, the gap between the plates may be established by means of other spacer elements, for example small spherules of plastic or glass or certain sand fractions, these spacer elements then being applied together with the adhesive and then jointly forming the sealing ring. The sealing ring contains one or two cutouts which are used to fill the electrochromic device. The gap between the two plates is from 0.005 and 2 mm, preferably from 0.02 to 0.5 mm. In the case of large-area display devices, particularly those made of plastic, it may be advantageous to use spacer elements, for example plastic spherules of identical diameter, which are distributed over the area of the display device, to keep the gap between the plates constant.

This display device is filled with an electrochromic fluid via the ports in the sealing ring, this process requiring humidity and oxygen to be excluded at all times. Filling can be effected, for example, by means of fine cannulae or alternatively via the vacuum filling technique, in the course of which the device and the fluid, put into a shallow dish, are introduced into an evacuable container, which is evacuated. Then the display device, which comprises only one filling port, is immersed, with that port, into the fluid. When the vacuum is removed, the liquid is then forced into the display device.

Next the filling ports are tightly sealed and cemented shut.

The novel electrochromic display device comprises at least one solvent in which the electrochromic substances, optionally a conducting salt and optionally further additives are dissolved. The solvent may also be thickened like a gel, for example by polyelectrolytes, porous solids or nanoparticles having a large active surface area.

Suitable solvents include all solvents which are redox-inert under the voltages selected and which cannot dissociate from electrophiles or nucleophiles or themselves react as sufficiently strong electrophiles or nucleophiles and thus could react with the colored ionic free radicals. Examples are propylene carbonate, γ-butyrolactone, acetonitrile, propionitrile, glutaronitrile, methylglutaronitrile, 3,3'-oxydipropionitrile, hydroxypropionitrile, dimethylformamide, N-methylpyrrolidone, sulfolane, 3-methylsulfolane or mixtures thereof. Preferred are propylene carbonate and mixtures thereof with glutaronitrile.

Electrochromic fluid according to the invention may contain at least one inert conducting salt. Especially if at least one of the substances of the redox couple $RED_1/OX_2$ is ionic in nature, the addition of conducting salt can be dispensed with.

Suitable inert conducting salts include lithium salts, sodium salts and tetraalkylammonium salts, in particular the latter. The alkyl groups may have from 1 to 18 C atoms and may be identical or different. Preference is given to tetrabutylammonium. Anions suitable for these salts, but also anions $X^-$ in the formulae (II) to (VI), (CI), (CII) and (CV) to (CVII) in the metal salts include all redox-inert, colorless anions. Examples are tetrafluoroborate, tetraphenylborate, cyano-triphenylborate, perchlorate, chloride, nitrate, sulphate, phosphate, methanesulfonate, ethanesulfonate, tetradecanesulfonate, pentadecanesulfonate, trifluoromethanesulfonate, perfluorobutanesulfonate, perfluoroocatanesulfonate, benzenesulfonate, chlorobenzenesulfonate, toluenesulfonate, butylbenzenesulfonate, tert. butylbenzenesulfonate, dodecylbenzenesulfonate, trifluoromethylbenzenesulfonate, hexafluorophosphate, hexafluoroarsenate, hexafluorosilicate, 7,8- or 7,9-dicarbanidoundecaborate(1-) or (2-) which are optionally substituted on B- and/or C-atoms by one or two methyl, ethyl, butyl or- phenyl groups, dodecahydro-dicarbadodecarborate(2-) or B-methyl-C-phenyl-dodecahydro-dicarbadodecarbonate (1-). In the case of multivalent ions $X^-$ represents an equivalent, for example ½ $SiF_6^{2-}$.

The conducting salts are preferably employed in the range of from 0 to 1 mol/l.

Further additives to the electrochromic fluids may include thickeners, to control the viscosity of the electroactive solution. This may matter in avoiding segregation, i.e. the formation of stripy or patchy coloration upon prolonged operation of the electrochromic display device in the energized state, and for controlling the bleaching rate once the current has been switched off.

Suitable thickeners include all compounds customary for this purpose such as e.g. polyacrylate, polymethacrylate (Luctite LO), polycarbonate or polyurethane.

Possible further additives for the electrochromic fluid include UV absorbers to improve the lightfastness. Examples are Uvinul® 3000 (2,4-dihydroxybenzophenone, BASF), SANDUVOR® 3035 (2-hydroxy-4-n-octyloxybenzophenone, Clariant), Tinuvin® 571 (2-(2H-benzotriazol-2-yl)-6-dodecyl-4-methylphenol, Ciba), Cyasorb 24™ (2,2'-dihydroxy-4-methoxybenzophenone, American Cyanamid Company), UVINUL® 3035 (ethyl 2-cyano-3,3-diphenylacrylate, BASF), Uvinul® 3039 (2-ethylhexyl 2-cyano-3,3-diphenylacrylate, BASF), UVINUL® 3088 (2-ethylhexyl p-methoxycinnamate, BASF), CHIMASORB® 90 (2-hydroxy-4-methoxybenzophenone, Ciba).

The UV absorbers are employed in the range from 0.01 to 2 mol/l, preferably from 0.04 to 1 mol/l. They may also be mixed.

The electrochromic fluid contains each of the electrochromic substances $OX_2$ and $RED_1$, in particular those of the formulae (I) to (XX) and (CI) to (CIV), in a concentration of at least $10^{-4}$ mol/l, preferably from 0.001 to 0.5 mol/l. The total concentration of all the electrochromic substances present is preferably below 1 mol/l.

Operation of the novel electrochromic display device utilizes direct current which is constant, pulsed or varies in amplitude, for example sinusoidally. The voltage depends on the depth of color-desired, but-in particular on the reduction and oxidation potentials of the $OX_2$ and $RED_1$ used. Such potentials can be found, for example, in Topics in Current Chemistry, Volume 92, pp. 1–44 (1980) or Angew. Chem. 90, 927 (1978) or the literature quoted there. The difference in their potentials provides an indication for the voltage required, although the electrochromic display device can even be operated at a lower voltage or alternatively at a higher voltage. In many cases, e.g. if $OX_2$=formula (II) or (IV) and $RED_1$=formula (X), (XII), (XVI) or (XVII) are used or if they are linked via a bridge in accordance with formula (I), in particular formula (Ia) to (Id), this potential difference required for operation is $\leq 1$ V. Such electrochromic display devices can therefore readily be supplied with the current from photovoltaic silicon cells.

When the voltage is switched off, the novel electrochromic display device reverts to its original state. This erasure can be accelerated considerably if the segments with which contact has been made are short-circuited. The display can also be erased very rapidly by repeated polarity reversal of the voltage, the voltage optionally being reduced at the same time.

Varying the layer thickness of the electrochromic display device, the viscosity of the electrochromic solution and/or the diffusibility or drift mobility of the electrochromic substances allows the switching-on and switching-off times of the display device to be influenced within wide limits. Thus, for example, thin layers exhibit shorter switching times than thick ones. It is therefore possible to construct display devices which can be switched rapidly or slowly and can therefore be optimally tailored to each particular application.

In the case of slow display devices it is possible to retain the displayed information by employing an energy saving or refresh mode in the energized state. After the information to be displayed has been built up, for example by means of a DC voltage which is constant or varies at high frequency or is pulsed and is at an adequate level, the device is switched over to a pulsed or variable low-frequency DC voltage; in so doing, the contacting means of the segments are not short-circuited during the phases in which the voltage is zero. This low frequency may be in the range, for example, of 1 Hz or lower, the duration of the energized and de-energized phases not necessarily being of equal length, one possible option instead involving distinctly longer de-energized phases. Since during the currentless intervals in the non-shorted state the depth of color of the displayed information will decay only slowly, relatively short current pulses are sufficient for these losses to be compensated for once more in the subsequent refresh phase. This provides a flicker-free, virtually constant depth of color image which, however, to be maintained requires only a fraction of the current which would arise if there were a permanent current flow.

In a special embodiment of the novel electrochromic display device, such a device is integrated into a dimmable car mirror which therefore contains optionally activable information. Such a car mirror which comprises an activable electrochromic display device likewise forms part of the subject matter of the invention. The construction of this device in principle is as described above. However, one of the two glass or plastic plates is mirrored on one side. This mirror coating can be situated on that side of the plate which faces away from the electrochromic fluid. Alternatively, however, the mirror coating layer may face the electrochromic fluid. In that case this mirror coating layer is also used as a conductive layer. In at least one of the two conductive layers, or even in both, segments are then designed so as to be electrically separated from the remainder of the face, and contact is made with such segments. These segments can be of such design that they can be used, for example, to represent, in the above-described manner, any letters or numerals desired. Alternatively, however, they may be shaped in such a way that they represent entire letters or numerals or even entire words or numbers. Such a display device is then capable of acting as a dimmable car mirror, i.e. to black out the entire mirror, via a brightness-dependent electronic control system, so as to avoid, for example, the driver being dazzled by the headlights of vehicles following behind. In such a case the individual segments and the remainder of the face of the display device are energized with current in the same way. The special type of construction makes it possible, however, for additional information to be provided via the individual segments, for example on the outside temperature ("Watch out" Risk of skiddings on the distance to the preceding car ("distance") or on other potential hazards which can be detected by means of sensors, for example. In the bright, de-energized state of the remaining mirror face this information appears dark—the corresponding segments are carrying current—and in the dark, energized state of the mirror this information appears bright—the corresponding segments are therefore de-energized. A plurality of such displays in one car are also possible.

The novel electrochromic display device is dynamic and self-aligning. At the electrodes the electrochromic substances $RED_1$ and $OX_2$ are converted into their respective differently colored, for example colored oxidized or reduced form, $OX_1$ and $RED_2$, respectively, which then start to move in the direction of the counterelectrode, the charge state of the molecules changing in the process. This directional movement is referred to as drift. The drift of the colored molecules in the electric field prevents uncontrolled, lateral diffusion in the electrochromic fluid. The colored molecules are systematically guided toward one another. When two molecules OX, and RED, encounter one another inside the electrochromic fluid or alternatively close to or inside the Helmholtz double layer, they exchange one or more electrons to regenerate the, for example, colorless forms RED, and $OX_2$ which are then again able to diffuse or, if they are charged, drift toward the electrodes. While current is flowing, an image is produced which is macroscopically static, but microscopically dynamic, yet ordered.

Instead of entire molecules drifting it is also possible for the electrons to be passed on from one electrochromic substance to the other via intermolecular exchange and thus to be transported through the liquid layer between the electrodes.

By virtue of this dynamic behavior, which is controlled via the drift in the electric field, diffusion and recombination, the novel electrochromic display device is insensitive to disturbances, for example owing to movement in the electrochromic fluid. Such movement can be produced, for example, if pressure is exerted on the plates of such a device, in particular if the plates are made of plastic and/or in the case of a display device having relatively large dimensions. This movement may lead to a displacement of the colored fluid zones between electrically driven segments and thus to blurring of the contours. By virtue of the dynamic behavior just described such blurred contours are rapidly broken down and sharp contours corresponding to the shapes of the segments are built up. The device is therefore self-aligning and self-healing.

The dynamic behavior just set forth also leads to sharp delimitation of the colored portion of the electrochromic fluid and thus to a very high edge definition of the segments to be displayed and to high contrast. Blurring of the contours by lateral diffusion is prevented by the strictly directional drift. Additionally the edge definition is enhanced by exaggerated contrast at the edge of the segments.

The considerable drawbacks disclosed by WO-94/23333 mentioned at the outset, such as diffusion and permanent current flow, surprisingly do not arise in the novel display device. Surprisingly, the diffusion is dominated by the drift, given a suitable choice of electrochromic substances, although it is to a certain extent responsible, together with the permanent current flow, for the self-aligning characteristics of the display device. Without a permanent current flow in conjunction with the dynamic behavior of the system, comprising diffusion, drift and recombination, said self-alignment would not be possible and such a display device would rapidly produce a fuzzy, low-contrast and therefore useless image as is known from the literature.

Drift, diffusion and recombination depend on the structure of the electrochromic substances. Diffusion and drift, for example, depend on the molecular size and shape, drift additionally, for example, on the charge state and the magnitude of the charge. Recombination depends, for example, on the molecular shape and the redox potentials.

Preference is given to the use, in the electrochromic display device, of electrochromic substances $RED_1$ and $OX_2$ in which the difference in the charge of their colored oxidation or reduction products $OX_2$ and $RED_2$ is at least +2. One example is $OX_2$=formula (CI) and $RED_1$=formula (XII), (XVI) or (XVII). Preference is therefore also given to electrochromic display devices which contain electrochromic substances having the properties just described.

Particular preference is given to the use of redox systems of the formula (I) which are linked via a bridge, in particular of those of the formula (Ia) to (Id), and to the display devices containing such redox systems.

Especially preferred is the use of such bridged redox systems of the formula (Ia, $OX_2$-B-$RED_1$) in electrochromic display devices, in which the charge difference between the oxidized form $OX_2$-B-$OX_1$ and the reduced form $RED_2$-B-$RED_1$ as described above is at least +2, and of the display devices containing such redox systems.

One example of such a redox system of the formula (Ia) is:

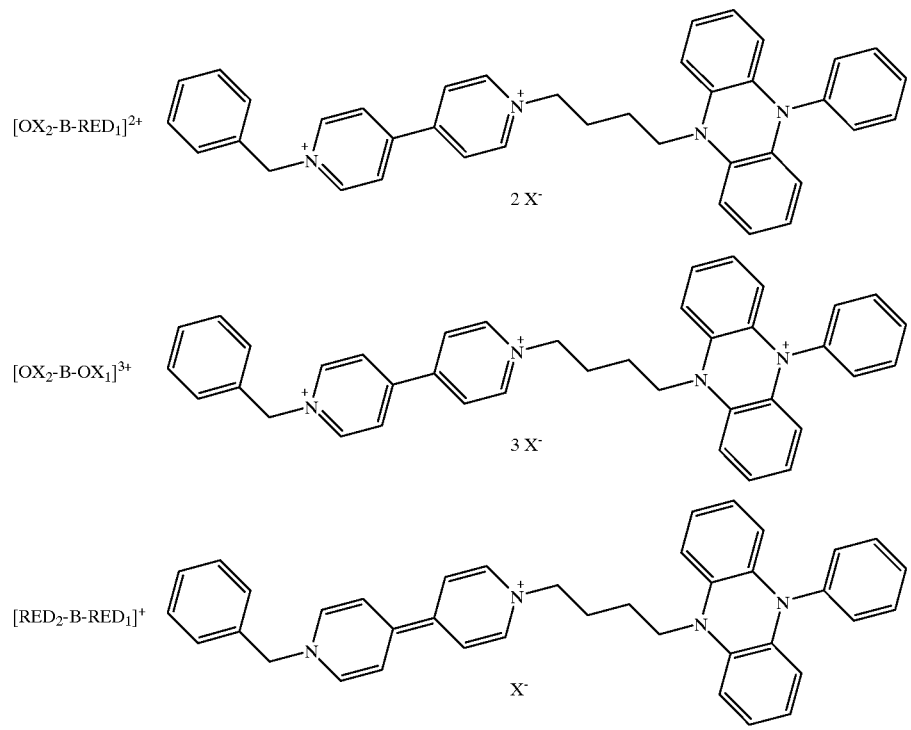

Likewise preferred is the use of such $OX_2$ and $RED_1$ whose corresponding $RED_2$ and $OX_1$ both carry the same type of charge, for example positive, and of display devices containing such electrochromic substances.

EXAMPLES

Example 1

A glass plate coated with ITO was sprayed with a commercially available photoresist, e.g. Positive 20 from Kontakt Chemie, Iffezheim, on the coated side and dried in the dark at from 50 to 70° C. for 1 h. The resist layer was then covered with a film, contained black segments in a transparent environment. This film was printed with a laser printer in accordance with a template produced on a computer. Through this film the photoresist layer was then exposed for from 1 to 5 min to UV light (from a mercury lamp, e.g. HBO 200W/2 from Osram or from a xenon high pressure lamp XBO 75W/2 from Osram). The film was removed and the resist layer treated in such a way in a sodium hydroxide solution bath (7 g of sodium hydroxide per liter of water) that the unexposed areas were rinsed off. Then the glass plate thus prepared was immersed in a bath comprising 67 g of $FeCl_2 \times 4\ H_2O$, 6 g of $SnCl_2 \times 2\ H_2O$, 104 ml of water and 113 ml of 37 wt % hydrochloric acid, which caused the ITO layer to lift off at the resist-free previously unexposed locations. The remaining resist layer was removed with acetone. A glass plate (1) was thus obtained which carried segments (4), conductor connections (3) and contacts (2).

A polyethylene film having a thickness of 0.2 mm was cut out to produce a rectangular ring from which, at one of its longitudinal sides, a piece having a length of about 1–2 cm was removed (5). This film was then placed onto the ITO-coated side of a second glass plate (7). Outside the film—with the exception of the opening (6)—a two-part adhesive, for example UHU® plus endfest 300 from UHU GmbH, Buihl in Baden was spread on. Then the etched glass plate (1) prepared in the above-described manner was laid onto the film in such a way that the ITO layer was situated on the side of the film. The two-part adhesive was then allowed to cure, if required by slight heating to about 40° C.

Then, under a nitrogen or argon atmosphere, the cell was filled via the port (6), for example with the aid of a fine pipette or by the solution being drawn in in a vacuum, with a solution of 220 mg of the electrochromic compound of the formula

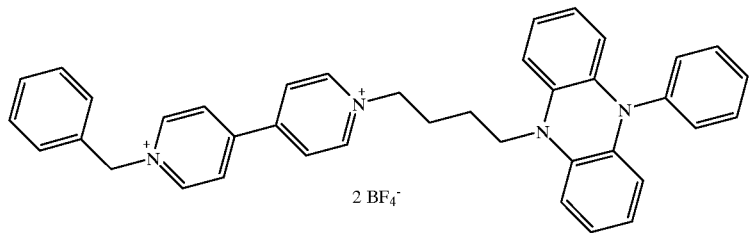

in 10 ml of anhydrous propylene carbonate, said solution having been prepared under a nitrogen or argon atmosphere. The filling port (6) was then filled with a matching piece of polyethylene film and tightly sealed with two-part adhesive.

Applying a voltage of 0.8 V to the contact (2) of the segments as the cathode and the unetched second plate (7) as the anode rapidly produced a deeply greenish-blue image of the segments with which contact had been made (absorption maxima at 436, 454, 468, 570, 606, 665 nm). All the characters and numerals which can be depicted by means of 7 segments were thus capable of being generated in a deep greenish blue on a pale yellow background. Switching off the voltage and short-circuiting the contacts rapidly caused the image to disappear again.

Example 2

The electrochromic display device of Example 1 was used. All the segments were energized with a voltage of 0.8 V for 30 s. This produced a deeply greenish-blue "8" on a pale yellow background. Then the voltage was alternatively switched off for 5 s and switched on for 5 s, without the contacts being short-circuited during the de-energized phase. The image of the "8" persisted with an almost constant intensity. Finally the voltage was switched off and the contacts were short-circuited. Over a period of 30 s the image of the "8" had entirely disappeared.

Example 3

In a manner similar to that of Example I an electrochromic display device was constructed in which, instead of the segments, continuous lettering was produced as a segment, by etching, on the one plate. The lettering was switched as the anode for 10 min, and the unpatterned counterelectrode was switched as the cathode at an operating voltage of 0.8 V. The lettering developed as a clear pattern in a bold yellow, the edge of the lettering being slightly blurred, whereas the background area was colored blue. Then the polarity was reversed. The lettering changed color via green to a bold blue, whereas the background area changed via a very pale greenish color to a yellow. After 10 min deep-blue writing on a yellow background had been attained, the writing exhibiting excellent edge definition. The change in color could be carried out as many times as required by repeated polarity reversal.

Example 4

An electrochromic display device was constructed as in Example 3, except that a small nitrogen gas bubble was left deliberately in the cell interior. The display was now, for example, connected in such a way that the lettering operated as the cathode and the sheet-like counterelectrode operated as the anode. Using 0.8 V, deep-blue writing on a yellow background was obtained as in Example 3. If the display device was then tilted, allowing the gas bubble to rise across said lettering, the gas bubble produced swirling in the electrochromic fluid and therefore also in the displayed lettering. As little as 20 to 30 s later, however, the swirled picture had completely decayed, and in its place the sharp lettering as at the start of the experiment had reestablished itself.

Example 5

An electrochromic display device was constructed as in Example 1, except that instead of the glass plates plates made of polycarbonate, for example MACROLON® from Bayer were used. However, both ITO layers were etched in accordance with the procedure of Example 1, and this was done in such a way that the corresponding segments, after the plates had been put on top of one another with their sides carrying the conductive coatings, were entirely congruent.

It was possible, by applying a voltage of 0.8 V to the various segments, to display any desired letter or numeral. The display device was flexible and at all times showed a sharp image, even after flexing.

Example 6

An ITO-coated glass plate was scribed, by means of a glass cutter, with parallel lines spaced at 2 mm in such a way that the ITO strips formed were electrically separated from one another. In a manner similar to that of Example I a display device was constructed, although the second glass plate did not have a conductive coating. This device was filled and sealed as in Example 1. If a voltage of 0.8 V was applied to two adjacent strips, the strip at the negative terminal turned deep blue and the strip at the positive terminal turned deep yellow. After the voltage was switched off and the contacts were short-circuited the color disappeared again within about 30 s. If all the strips were connected alternately to the negative terminal and the positive terminal, respectively of the voltage source, this produced a striped pattern of blue and yellow stripes which were clearly separated from one another with high edge definition.

Examples 7 to 20

In an entirely similar manner it was possible to construct an electrochromic display device, using the following electrochromic substances and optionally additives. The hues are listed both as mixed colors, in accordance with Example 1, and as individual colors, in accordance with Example 6.

The structures of the UV absorbers listed in the column "Additives" can be found on page 28.

| Ex. | OX₂ | RED₁ | Solvent | Additives | Color |
|---|---|---|---|---|---|
| 7 | 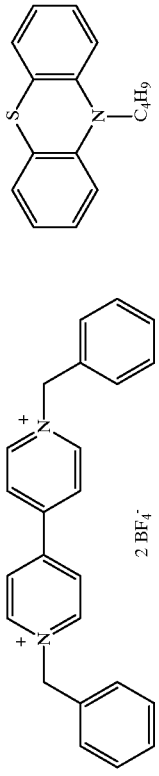 | 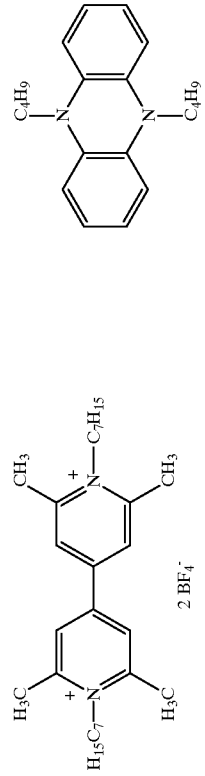 | Glutardinitrile | UVINUL® 3039 | purple-/blue blue-red |
| 8 | 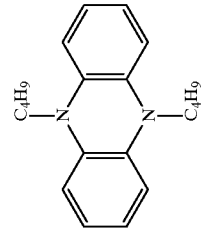 | 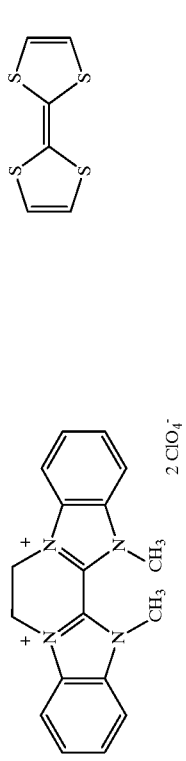 | Propylene-carbonate | (C₄H₉)₄N⁺BF₄⁻ | greenish blue blue-yellow |
| 9 | 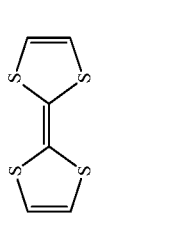 | 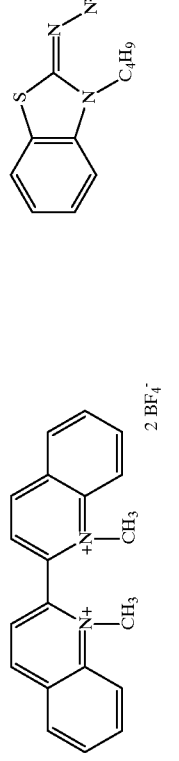 | Methylsulfolane | — | brown/ green - red |
| 10 | 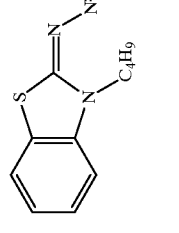 |  | Propylene-carbonate/ Glutaro-nitrile 1:1 | — | green/ green - yellow |

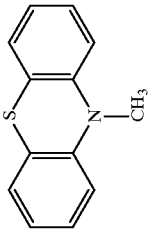

-continued
| Ex. | $OX_2$-B-$RED_1$ | Solvent | Additives | Color |
|---|---|---|---|---|
| 13 |  | Glutaronitrile | UVINUL ® 3088 | purple-blue/ blue-red |
| 14 | 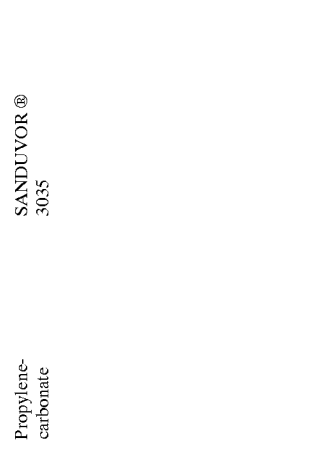 | Propylene-carbonate | SANDUVOR ® 3035 | green/ yellowmx,3 blue - |
| 15 | 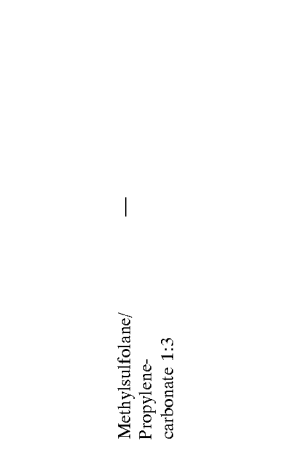 | Methylsulfolane/ Propylene-carbonate 1:3 | — | greenish blue/ blue - yellow |

-continued

| Ex. | RED$_1$-B-OX$_2$-B-RED$_1$ | Solvent | Additives | Color |
|---|---|---|---|---|
| 16 | (structure with two phenothiazine groups linked via (CH$_2$)$_4$ to bipyridinium, 2 BF$_4^-$) | Propylene-carbonate | UVINUL ®3035 | purple/blue - red |
| 17 | (structure with two phenothiazine groups linked via (CH$_2$)$_4$ to bipyridinium, 2 BF$_4^-$) | Propylene-carbonate | UVINUL ® 3035 | greenish blue/blue - yellow |

OX$_2$ oder RED$_1$ (triazolium structure with trimethoxyphenyl, benzodioxole, chlorothiazole-CHF$_2$ substituents; phenylsulfonate counterion)

| Ex. | OX$_2$-B-RED$_1$ | Solvent | Additives | Color |
|---|---|---|---|---|
| 18 | (phenazine linked via (CH$_2$)$_4$ to bipyridinium with benzyl group, 2 C$_{12}$H$_{25}$-C$_6$H$_4$-SO$_3^-$) | Glutaronitrile | N(CH$_3$)$_4^+$BF$_4^-$ | black/blue-orange |

| Ex. | RED₁-B-OX₂-B-RED₁ | | Solvent | Additives | Color |
|---|---|---|---|---|---|
| 19 | [structure: phenyl-diazine–CH₂–C₆H₄–CH₂–N⁺(CH₃)-pyridyl-pyridyl-N⁺(CH₃)(C₄H₉); 2 BF₄⁻] | [structure: tetrathiafulvalene] | Propylene-carbonate | — | black/blue-orange |
| 20 | [structure: N-CH₃ diazine–(CH₂)₄–N⁺-biphenyl-N⁺–(CH₂)₄–diazine-N-CH₃; 2 BF₄⁻] | [structure: N,N′-dibenzyl-4,4′-bipyridinium; 2 BF₄⁻] | Propylene-carbonate | — | greenish blue/blue-yellow |

What is claimed is:

1. An electrochromic display device comprising at least two transparent substrates which are joined to one another via a spacer ring and of which at least one has an electrically conductive, transparent coating on the side facing the other and one of the substrates may be mirrored, wherein at least one of the substrates having a conductive coating is subdivided into segments which are electrically separated from one another and can be contacted singly, and there is contained, between the substrates,
   a) a solvent,
   b) dissolved in this solvent at least one oxidizable substance $RED_1$ which, by releasing electrons at an anode, is converted into its respective form $OX_1$ with a change in absorbance in the visible region of the spectrum, and at least one reducible substance $OX_2$ which by accepting electrons at a cathode, is converted into its respective form $RED_2$ with a change in absorbance in the visible region of the spectrum, the original forms $RED_1$ and $OX_2$ each being recovered after charge equalization,
   c) optionally a conductive salt.

2. The electrochromic display device as claimed in claim 1, wherein the substrates are plates,
   aa) both plates having a conductive coating, but only one of the two plates being subdivided into segments, whereas the other plate is not patterned, or
   ab) both plates having conductive coatings and being subdivided into segments or
   ac) only one of the two plates having a conductive coating and being subdivided into segments, whereas the other one does not have a conductive coating,
or
   b) the plates being patterned in such a way that multiplexed driving is possible.

3. The electrochromic display device as claimed in claim 1, which is dynamic and self-aligning, controlled via drift, diffusion and recombination of the electrochromic substances $RED_1/OX_1$ and $OX_2/RED_2$ involved in the redox process.

4. The electrochromic display device as claimed in claim 1, wherein electrochromic substances having a low diffusion rate and/or high charge per molecule are employed.

5. The electrochromic display device as claimed in claim 1, which comprises $OX_2$ and $RED_1$ in which the difference in the charges of the corresponding $OX_1$ and $RED_2$ is at least +2.

6. The electrochromic display device as claimed in claim 1, which comprises $OX_2$ and $RED_1$ whose corresponding $RED_2$ and $OX_1$ both have the same type of charge.

7. The electrochromic display device as claimed in claim 1, wherein use is made of plates made of plastic and optional use is made of spacers.

8. The electrochromic display device as claimed in claim 1, wherein the electrochromic fluid comprises at least one thickener.

9. The electrochromic display device as claimed in claim 1, wherein
   a) both plates have a conductive coating, but only one of the two plates is subdivided into segments, whereas the other plate is not patterned, or
   b) both plates have conductive coatings and are subdivided into segments.

10. The electrochromic display device as claimed in claim 1, which can be operated in an energy saving mode or a refresh mode which, after the information has been built up by direct current, involves switching over to operation with the voltage which is pulsed at low frequency or varies, the contacted segments not being short-circuited during the currentless intervals.

11. The electrochromic display device as claimed in claim 1, which comprises, as $OX_2$, compounds of the formulae

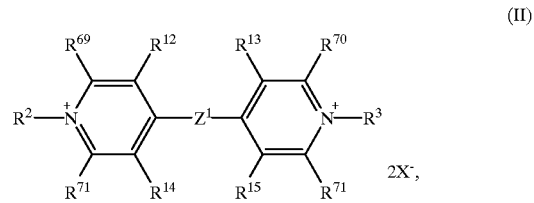

(II)

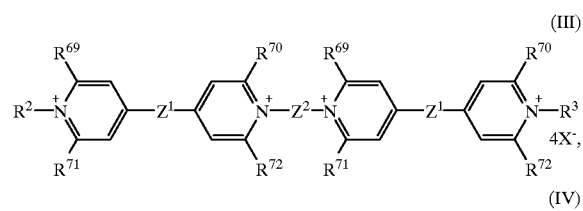

(III)

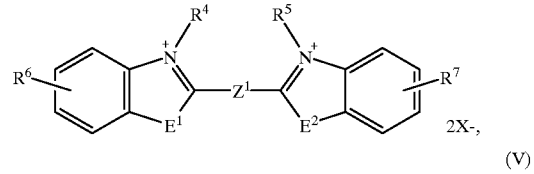

(IV)

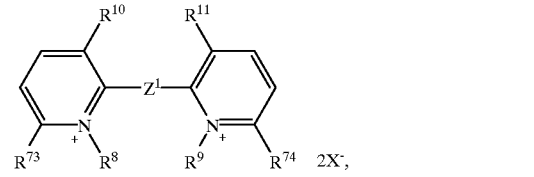

(V)

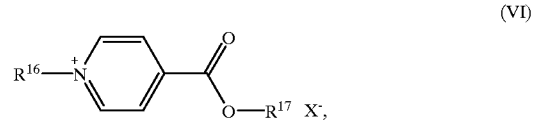

(VI)

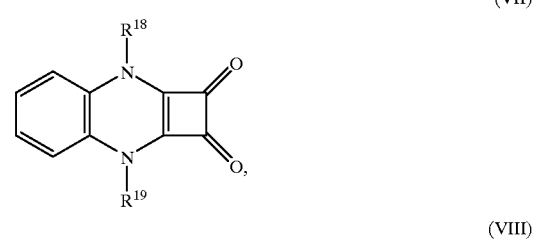

(VII)

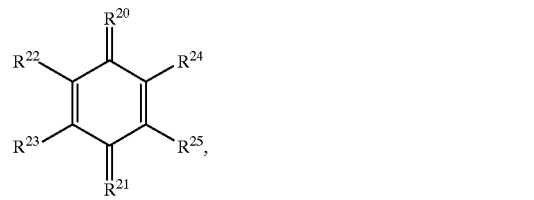

(VIII)

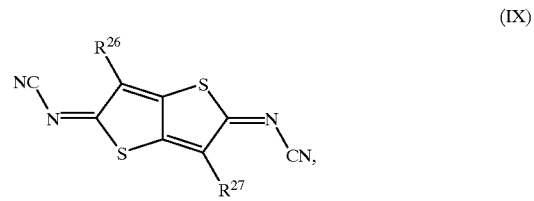

(IX)

-continued (CI)

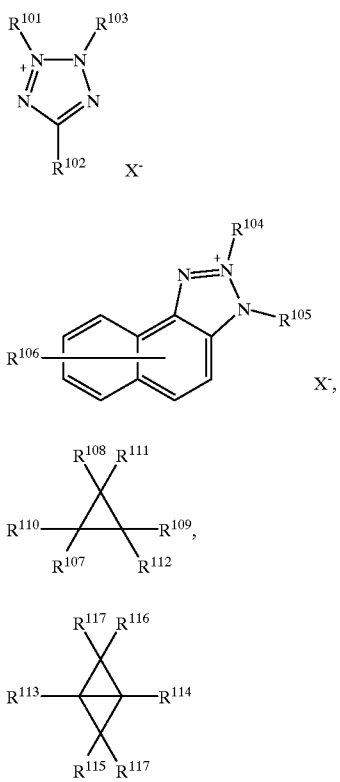

(CII)

(CIII)

(CIV)

in which
R² to R⁵, R⁸, R⁹, R¹⁶ to R¹⁹, independently of one another, represent $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl or R⁴; R⁵ or R⁸; R⁹ may jointly form a —(CH₂)₂— or —(CH₂)₃— bridge, R⁶, R⁷ and R²² to R²⁵, independently of one another, represent hydrogen, $C_1$- to $C_4$-alkyl, $C_1$- to $C_4$-alkoxy, halogeno, cyano, nitro or $C_1$- to $C_4$-alkoxycarbonyl or R²²; R²³ and/or R²⁴; R²⁵ may form a —CH=CH—CH=CH— bridge, R¹⁰; R¹¹, R¹²; R¹³ and R¹⁴; R¹⁵, independently of one another, represent hydrogen or pairwise represent a —(CH₂)₂—, —(CH₂)₃— or —CH=CH— bridge, R²⁰ and R²¹, independently of one another, represent O, N—CN, C(CN)₂ or N—C₆— to —C₁₀-aryl, R²⁶ and R²⁷ represent hydrogen, $C_1$- to $C_4$-alkyl, $C_1$- to $C_4$-alkoxy, halogeno, cyano, nitro, $C_1$- to $C_4$-alkoxycarbonyl or $C_6$- to $C_{10}$-aryl, R⁶⁹ to R⁷⁴, independently of one another, represent hydrogen or $C_1$- to $C_6$-alkyl or R⁶⁹; R¹² and/or R⁷⁰; R¹³ jointly form a —CH=CH—CH=CH— bridge, E¹ and E², independently of one another, represent O, S, NR¹ or C(CH₃)₂ or E¹ and E² jointly form an —N—(CH₂)₂—N— bridge, R¹ represents $C_1$- to $C_{18}$-alkyl, $C_9$- to $C_{12}$-alkenyl, $C_4$- to $C_7$-cycloalkyl, $C_7$- to $C_{15}$-aralkyl, $C_6$- to $C_{10}$-aryl, Z¹ represents a direct bond, —CH=CH—, —C(CH₃)=CH—, —C(CN)=CH—, —CCl=CCl—, —C(OH)=CH—, —CCl=CH—, —C—C—, —CH=N—N=CH—, —C(CH₃)=N—N=C(CH₃)— or —CCl=N—N=CCl—, Z² represents —(CH₂)ᵣ— or —CH₂—C₆H₄—CH₂—, r represents an integer from 1 to 10, R¹⁰¹ to R¹⁰⁵, independently of one another, represent $C_6$- to $C_{10}$-aryl or an aromatic or quasi-aromatic five- or six-membered heterocyclic ring each of which is optionally benzanellated, R¹⁰⁷, R¹⁰⁹, R¹¹³ and R¹¹⁴, independently of one another, represent a radical of the formulae (CV) to (CVII)

 (CV)

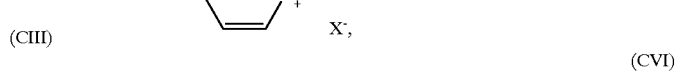 (CVI)

 (CVII)

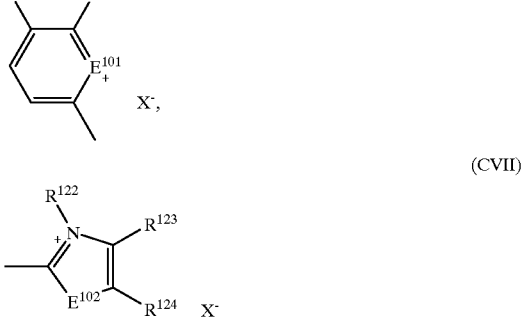

R¹⁰⁸, R¹¹⁵ and R¹¹⁶, independently of one another, represent $C_6$- to $C_{10}$-aryl or a radical of the formula (CV), R¹¹⁰ to R¹¹², R¹¹⁷ and R¹¹⁸, independently of one another, represent hydrogen, $C_1$- to $C_4$-alkyl, halogeno or cyano, E¹⁰¹ and E¹⁰², independently of one another, represent O, S or N-R¹¹⁹, R¹¹⁹ and R¹²², independently of one another, represent $C_1$- to $C_{18}$-alkyl, $C_2$- to $C_8$-alkenyl, $C_4$- to $C_7$-cycloalkyl, $C_7$- to $C_{15}$-aralkyl or $C_6$- to $C_{10}$-aryl, R¹⁰⁶, R¹²⁰, R¹²¹, R¹²³ and R¹²⁴, independently of one another, represent hydrogen, $C_1$- to $C_4$-alkyl, $C_1$- to $C_4$-alkoxy, halogeno, cyano, nitro or $C_1$- to $C_4$-alkoxycarbonyl or R¹²⁰, R¹²¹ or R¹²³, R¹²⁴ jointly form a —CH=CH—CH=CH— bridge and X⁻ represents an anion which is redox-inert under the conditions, or metal salts or metal complexes, preferably of metal ions whose oxidation states differ by 1, and, as RED₁, compounds of the formulae (X)

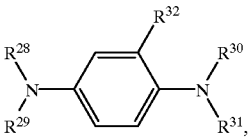

-continued

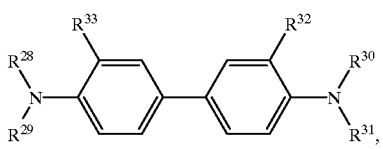 (XI)

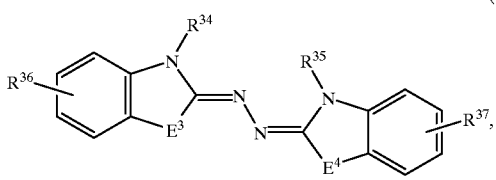 (XII)

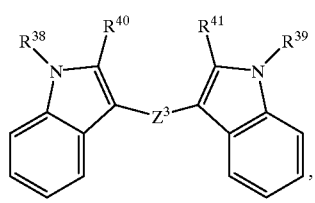 (XIII)

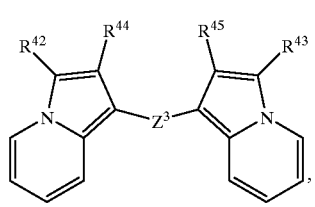 (XIV)

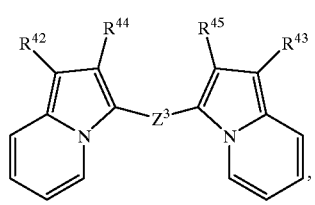 (XV)

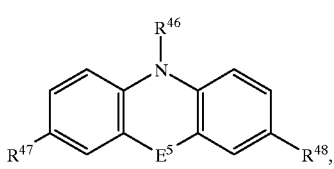 (XVI)

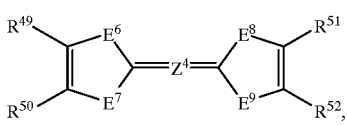 (XVII)

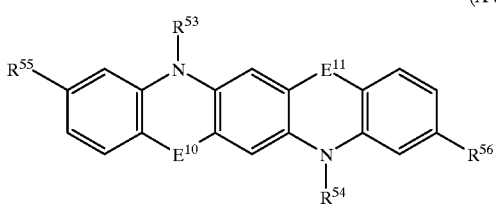 (XVIII)

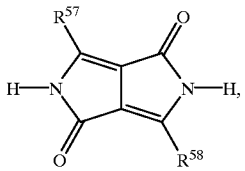 (XIX)

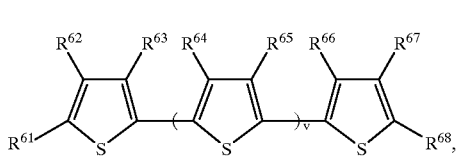 (XX)

in which $R^{28}$ to $R^{31}$, $R^{34}$, $R^{35}$, $R^{38}$, $R^{39}$, $R^{46}$, $R^{53}$ and $R^{54}$, independently of one another, represent $C_1$- to $C_{18}$-alkyl, $C_2$- to $C_{12}$-alkenyl, $C_4$- to $C_7$-cycloalkyl, $C_7$- to $C_{15}$-aralkyl or $C_6$- to $C_{10}$-aryl, $R^{32}$, $R^{33}$, $R^{36}$, $R^{37}$, $R^{40}$, $R^{41}$, $R^{42}$ to $R^{45}$, $R^{47}$, $R^{48}$, $R^{49}$ to $R^{52}$ and $R^{55}$ to $R^{58}$, independently of one another, represent hydrogen, $C_1$- to $C_4$-alkyl, $C_1$- to $C_4$-alkoxy, halogeno, cyano, nitro, $C_1$- to $C_4$-alkoxycarbonyl, $C_6$- to $C_{10}$-aryl and $R^{57}$ and $R^{58}$ additionally represent an aromatic or quasi-aromatic five- or six-membered heterocyclic ring which is optionally benzannelated and $R^{48}$ additionally represents $NR^{75}R^{76}$ or $R^{49}$, $R^{50}$ and/or $R^{51}$; $R^{52}$ form a —(CH$_2$)$_3$—, —(CH$_2$)$_4$—, —(CH$_2$)$_5$— or —CH=CH—CH=CH— bridge, $Z^3$ represents a direct bond, a —CH=CH— or —N=N— bridge, =$Z^4$= represents a direct double bond, a =CH—CH= or =N—N= bridge, $E^3$ to $E^5$, $E^{10}$ and $E^{11}$, independently of one another, represent O, S, $NR^{59}$ or $C(CH_3)_2$ and $E^3$ and $E^4$, independently of one another, additionally may represent —CH=CH—, $E^6$ to $E^9$, independently of one another, represent S, Se or $NR^{59}$, $R^{59}$, $R^{75}$ and $R^{76}$ independently of one another represents $C_1$- to $C_{12}$-alkyl, $C_2$- to $C_8$-alkenyl, $C_4$- to $C_7$-cycloalkyl, $C_7$- to $Cl_5$-aralkyl, $C_6$- to $C_{10}$-aryl, and $R^{75}$ additionally represents hydrogen or $R^{75}$ and $R^{76}$ in the meaning of $NR^{75}R^{76}$ represent together with the N-atom to which they are bound a five or six-membered saturated heterocyclic ring which optionally contains further hetero atoms, $R^{61}$ to $R^{68}$, independently of one another, represent hydrogen, $C_1$- to $C_6$-alkyl, $C_1$- to $C_4$-alkoxy, cyano, $C_1$- to $C_4$-alkoxycarbonyl or $C_6$- to $C_{10}$-aryl and $R^{61}$; $R^{62}$ and $R^{67}$; $R^{68}$, independently of one another, additionally form a —(CH$_2$)$_3$—, —(CH$_2$)$_4$— or —CH=CH—CH=CH— bridge, and v represents an integer from 0 to 10, or metal salts or metal complexes, preferably of metal ions whose oxidation states differ by 1.

12. The electrochromic display device as claimed in claim 1, which comprises an electrochromic substance of the formula Y—[—B—Z—)$_a$—(—B—Y—)$_b$—]$_c$—B—Z  (I)

in which
- Y and Z, independently of one another, represent a radical $OX_2$ or $RED_1$, at least one Y representing $OX_2$, and at least one Z representing $RED_1$, however, where
- $OX_2$ represents the radical of an electrochemically reversibly reducible redox system, and
- $RED_1$ represents the radical of an electrochemically reversibly oxidizable redox system,
- B represents a bridge member,
- c represents an integer from 0 to 5, and
- a and b, independently of one another, represent an integer from 0 to 5.

13. The electrochromic display device as claimed in claim 1, which comprises an electrochromic substance of the formulae $$OX_2\text{-}B\text{-}RED_1 \tag{Ia}$$

$$OX_2\text{-}B\text{-}RED_1\text{-}B\text{-}OX_2 \tag{Ib}$$

$$RED_1\text{-}B\text{-}OX_2\text{-}B\text{-}RED_1 \text{, or} \tag{Ic}$$

$$OX_2\text{-}(B\text{-}RED_1\text{-}B\text{-}OX_2)_d\text{-}B\text{-}RED_1 \tag{Id}$$

in which
- $OX_2$, $RED_1$ and B have the abovementioned meanings and
- d represents an integer from 1 to 5.

14. The electrochromic display device as claimed in claim 1, wherein $OX_2$ and $RED_1$ represent, in particular, radicals of the above-described redox systems of the formulae (II) to (IX), (CI) to (CIV) and (X) to (XX), where the bond to the bridge member B is effected via one of the radicals $R^2$ to $R^{19}$, $R^{22}$ to $R^{27}$, $R^{28}$ to $R^{58}$, $R^{61}$, $R^{62}$, $R^{67}$, $R^{68}$, $R^{122}$ or, in the case that one of the radicals $E^1$ or $E^2$ represents $NR^1$, or one of the radicals $E^3$ to $E^{11}$ represents $NR^{59}$, or one of the radicals $E^{101}$ to $E^{102}$ represents $NR^{119}$ is effected via $R^1$, $R^{59}$ or $R^{119}$ and said radicals then represent a direct bond, and

- B represents a bridge of the formulae $-(CH_2)_n-$ or $-[Y^1_s(CH_2)_m-Y^2]_o-(CH_2)_p-Y^3_q-$, which may be substituted by $C_1$- to $C_4$-alkyl, $C_1$- to $C_4$-alkoxy, halogeno or phenyl,
- $Y^1$ to $Y^3$, independently of one another, represent O, S, $NR^{60}$, COO, CONH, NHCONH, cyclopentanediyl, cyclohexanediyl, phenylene or naphthylene,
- $R^{60}$ represents $C_1$- to $C_6$-alkyl, $C_2$- to $C_6$-alkenyl, $C_4$- to $C_7$-cycloalkyl, $C_7$- to $C_{15}$-aralkyl or $C_6$- to $C_{10}$-aryl,
- n represents an integer from 1 to 12,
- m and p, independently of one another, represent an integer from 0 to 8,
- o represents an integer from 0 to 6 and
- q and s, independently of one another, represent 0 or 1.

15. An electrochromic display comprising electrochromic substances as mentioned in claim 11.

* * * * *